US012464016B2

(12) United States Patent
Minsky

(10) Patent No.: US 12,464,016 B2
(45) Date of Patent: Nov. 4, 2025

(54) DISCRIMINATING DEFENSE AGAINST DDoS ATTACKS

(71) Applicant: Rutgers, The State University of New Jersey, New Brunswick, NJ (US)

(72) Inventor: Naftaly H. Minsky, New York, NY (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 224 days.

(21) Appl. No.: 18/570,284

(22) PCT Filed: Jun. 17, 2022

(86) PCT No.: PCT/US2022/073018
§ 371 (c)(1),
(2) Date: Dec. 14, 2023

(87) PCT Pub. No.: WO2022/266672
PCT Pub. Date: Dec. 22, 2022

(65) Prior Publication Data
US 2024/0291857 A1 Aug. 29, 2024

Related U.S. Application Data

(60) Provisional application No. 63/211,885, filed on Jun. 17, 2021.

(51) Int. Cl.
*H04L 9/40* (2022.01)
(52) U.S. Cl.
CPC ...... *H04L 63/1458* (2013.01); *H04L 63/0227* (2013.01); *H04L 63/0823* (2013.01); *H04L 2463/143* (2013.01)

(58) Field of Classification Search
CPC ............ H04L 63/1458; H04L 63/0227; H04L 63/0823; H04L 2463/143; H04L 2463/141; H04L 43/02
See application file for complete search history.

(56) References Cited

U.S. PATENT DOCUMENTS

| 9,973,529 B1 | 5/2018 | Bharrat et al. |
| 2005/0177717 A1 | 8/2005 | Grosse |
| (Continued) | | |

FOREIGN PATENT DOCUMENTS

| WO | 03/69828 A2 | 8/2003 |
| WO | 2022/266672 A1 | 12/2022 |

OTHER PUBLICATIONS

International Search Report and Written Opinion received for PCT Patent Application No. PCT/US2022/073018, mailed on Sep. 6, 2022, 7 pages.

*Primary Examiner* — Huan V Doan
(74) *Attorney, Agent, or Firm* — Hamilton, Brook, Smith & Reynolds, P.C.

(57) ABSTRACT

Embodiments defend a node in a network, e.g., a server or website, against distributed denial of service (DDoS) attacks through use of a criterion of discrimination between messages that the defended network node considers important to receive, and all other messages addressed to the defended network node. The use of this new criterion upends the conventional approach to defense against DDoS attacks. Whereas the conventional defense methods attempt to identify attack packets in order to drop them, embodiments identify packets that comply with an indication of packets defined as important by the defending server, as determined by a verification performed using the criterion of discrimination, thus making sure the compliant packets are delivered to their destination, while providing functionality for all (Continued)

other packets (those not identified as compliant) to be dropped.

16 Claims, 6 Drawing Sheets

(56) References Cited

U.S. PATENT DOCUMENTS

| | | |
|---|---|---|
| 2005/0220017 A1 | 10/2005 | Brand et al. |
| 2016/0219065 A1* | 7/2016 | Dasgupta ............ H04L 63/1441 |
| 2017/0063920 A1 | 3/2017 | Thomas et al. |
| 2021/0112091 A1* | 4/2021 | Compton ............ H04L 63/1416 |

* cited by examiner

DISCRIMINATING DEFENSE AGAINST DDoS ATTACKS

RELATED APPLICATIONS

This Application is the U.S. National Stage of International Application No. PCT/US2022/073018, filed on Jun. 17, 2022, which designates the U.S., published in English, and claims the benefit of U.S. Provisional Application No. 63/211,885, filed on Jun. 17, 2021. The entire teachings of the above applications are incorporated herein by reference.

BACKGROUND

A circa 2020 paper [6] (bracketed numbers in this document refer to the enumerated list of references hereinbelow) by Osterwile et al., entitled "21 Years of Distributed Denial of Service: A Call to Action," states: "We are falling behind in the war against distributed denial-of-service attacks. Unless we act now, the future of the Internet could be at stake." An earlier (circa 2007) paper [7] by Peng et al. states: "a key challenge for the defense [against DDoS attacks] is how to discriminate legitimate requests for service from malicious access attempts." This challenge has not yet been met, which is a major reason for the dire situation described by Osterwile et al.—thirteen years later.

SUMMARY

The present disclosure describes solutions to this challenge, wherein methods and systems include functionality for discriminating between messages that a given site considers important, and all other messages sent to that site. Implementations are subsequently described, including two exemplary anti-DDoS mechanisms that make use of such discrimination.

According to some aspects of the present disclosure, a method of defending a server against distributed denial-of-service (DDoS) attacks includes obtaining an indication of packets defined as important by a defending server. The method further includes defining a discrimination criterion. The discrimination criterion is a mechanism to identify packets complying with the obtained indication. The method further includes obtaining packets, and, for each obtained packet, controlling transmission of the packet to the defending server based on a verification, using the discrimination criterion, that the packet complies with the obtained indication, thereby defending the server from DDoS attacks.

According to some aspects, controlling the transmission of the packet to the defending server includes transmitting the packet to the defending server in response to a result of the verification indicating compliance with the obtained indication, or, at a scrubber or an appendix thereof, dropping the packet in response to the result of the verification indicating non-compliance with the obtained indication. Such aspects are hereinafter referred to as the scrubbing++ mechanism, or simply as scrubbing++.

Some implementations include, at a router, in response to a given packet of the obtained packets being obtained from a node that is external to a domain of the router, adding a pass field to the given packet and setting the pass field to indicate non-compliance.

According to some aspects, controlling transmission of the packet to the defending server includes, at a guarding node associated with the defending server, modifying or maintaining a pass field of the packet to indicate compliance or non-compliance with the obtained indication.

In some such aspects, controlling the transmission of the packet to the defending server further includes transmitting the packet to the defending server. Such aspects are hereinafter referred to as the discriminating anti-DDoS (DAD) mechanism, simply as DAD, or as the inherent defense.

In other such aspects, controlling the transmission of the packet to the defending server further includes transmitting the packet to the defending server in response to the pass field of the packet indicating compliance with the obtained indication, or, at a router, carrying out a policy of dropping the packet in response to the pass field of the packet indicating non-compliance with the obtained indication. Such aspects are hereinafter referred to as the DAD1 mechanism, DAD1, the active defense, or the invoked defense.

Such aspects may further include configuring the router to establish, in response to receiving a protection command, the policy of dropping the packet in response to the pass field of the packet indicating non-compliance. Such a protection command may originate, or at least be received, via the defending server.

Alternatively, or in addition, such aspects may include at least one of configuring the router to suspend, after a time interval, the policy of dropping the packet in response to the pass field of the packet indicating non-compliance, and instating the policy in response to receiving an indication that the defending server is under attack. The indication that the defending server is under attack may be received subsequent to the suspending of the policy, causing the policy to be reinstated, as either the attack that triggered the original instatement of the policy is ongoing, or a new attack has already begun.

As another alternative, or additional, implementation, such aspects may include tracking a quantity of packets addressed to the defending server that arrive at the router within a time interval, and suspending, in response to receiving a status indicator indicating that the defending server is not under attack, the policy of dropping the packet in response to the pass field of the packet indicating non-compliance. The status indicator of such aspects may have been set based on the tracked quantity.

According to some aspects of the present disclosure, the method may include recursively changing a port number of a guarding node or a scrubber configured to support the controlling of the transmission of the packet to the defending server. The method may include receiving, from a registry of servers, an indication of approval to defend the defending server.

The obtained indication may include at least one of a rate control parameter, and a self-authentication requirement. The verification that the packet complies with the obtained indication may include verifying a certificate of a sender of the packet, and verifying a hash of the discrimination criterion presented by the sender of the packet.

Another aspect of the present disclosure includes a system for defending a server against distributed denial-of-service (DDoS) attacks. Such a system includes a processor, and a memory with computer code instructions stored thereon. The processor and the memory, with the computer code instructions, are configured to cause the system to obtain an indication of packets defined as important by a defending server, and to define a discrimination criterion. The discrimination criterion is a mechanism to identify packets complying with the obtained indication. The processor and the memory, with the computer code instructions, are configured to further cause the system to obtain packets, and, for each obtained packet, control transmission of the packet to the defending server based on a verification, using the discrimination criterion, that the packet complies with the obtained indication. The system thereby defends the server from DDoS attacks.

According to yet another aspect of the present disclosure, a computer program product for defending a server against distributed denial-of-service (DDoS) attacks includes a non-transitory computer-readable medium having computer-readable program instructions stored thereon. The instructions, when executed by a processor, cause the processor to defend a server against distributed denial-of-service (DDoS) attacks as described herein.

It is noted that embodiments of the method, system, and computer program product may be configured to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
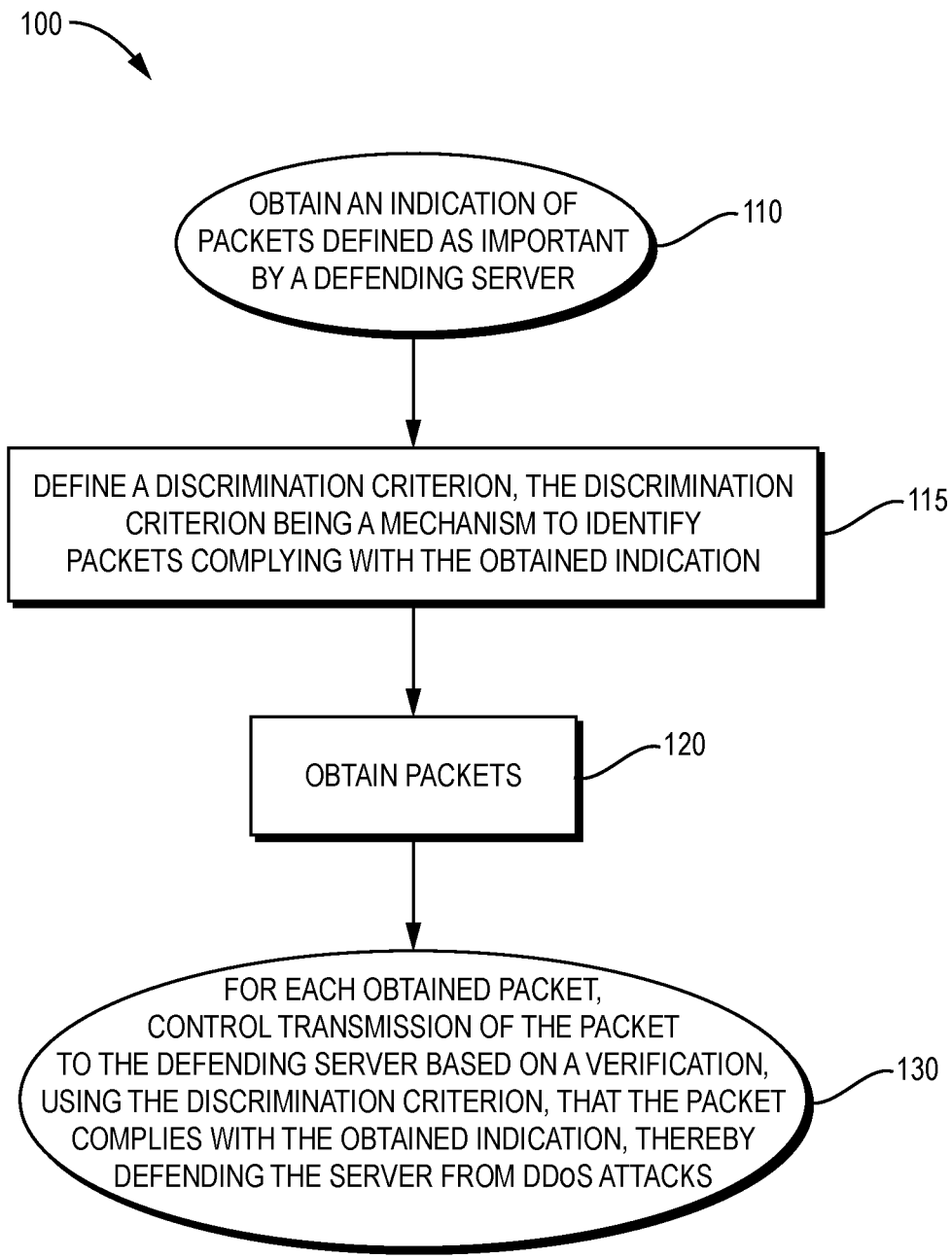
FIG. 1 is a flow diagram illustrating an example method of defending a server against DDoS attacks according to an embodiment.

A description of example embodiments follows.

1 Introduction

A circa 2007 paper [7] by Peng et al. states: "a key challenge for the defense [against DDoS attacks] is how to discriminate legitimate requests for service from malicious access attempts." A similar view was expressed even earlier (circa 2002) by Ioannidis and Bellovin in their famous "Pushback" paper [2], as follows: "If we could unequivocally detect packets belonging to an attack and drop just those, the problem would be solved."

This challenge has not yet been met, which is a major reason for the dire situation described by Osterwile et al. in their circa 2020 paper [6], entitled "21 Years of Distributed Denial of Service: A Call to Action." The Osterwile paper states: "We are falling behind in the war against distributed denial-of-service attacks." The seriousness of this situation is reflected by the large number of scholarly papers recently published on this topic. In particular, Google scholar reported in 2022 that since 2018, there had been 21,900 papers published with the term "DDoS" in their title, and that the publication rate of such papers is picking up, with 15,000 of them published in 2021 and 2022. Additionally, the need for widely available defense against DDoS became particularly clear in the Russian DDoS attacks against Ukraine during the Russian invasion of Ukraine in February 2022.

The goal of the present disclosure is twofold: a first goal is to meet a variant of Peng's challenge, rephrased as follows: providing means for discrimination between messages that a given site considers important to receive—particularly when it is under an attack—and all other messages sent to it. And the criterion for such discrimination needs to be unequivocal, and easily recognizable. Note that importance, i.e., what a given site considers important, here is local to a given site—different sites are likely to consider different types of messages as important.

A second goal is to use this criterion of discrimination for constructing effective defense against DDoS attacks.

1.1 Discrimination Between Messages That a Given Site Considers Important to Receive, and All Other Messages According to aspects of the present disclosure, a site configured to defend itself against DDoS attacks defines explicitly the type of messages that it considers important to receive, particularly when it is under an attack such as a DDoS attack. A "site" may herein refer to a website hosted by a server, or the server itself, where the server is deployed upon the Internet or another network that may be susceptible to DDoS attack traffic. In terms of the present disclosure, such a site may be referred to as a "defending server," or simply as a "defender," and may be denoted as D. Such a definition of messages that are important to D includes the following conditions:

C1: Messages of a type classified as important to a given defender D are not able to contribute meaningfully to a DDoS attack on D); or, they are trusted by D not to do so.

C2: A criterion of discrimination facilitates differentiation between messages defined as being important to D and all other messages. This criterion is easily recognizable among various nodes of the network upon which D is deployed, including at the destination of messages and at their source.

If condition C1 is satisfied, D can be considered to be well defended from a DDoS attack if it receives practically all the important messages sent to it, and if most of the non-important messages sent to it are dropped, so that D would be able to accept the important messages, and to reply to them.

At least by satisfaction of C2, such a defense may be made possible. Accordingly, a criterion of discrimination enables recognition of important messages at their source, which has far reaching consequences as is described in Section 4 hereinbelow. It is worth pointing out that discrimination between, what is commonly called, legitimate and malicious messages, is rarely, if ever, achieved at the source of such messages—although such discrimination is widely considered the ideal.

Construction of such a criterion depends on a manner in which a set of important messages for a given defender are defined. Such definition cannot be based on any predicate defined over content of messages, because attackers may learn about such a predicate, and then send messages defined as important to the given defender. Moreover, the definition of important messages cannot be based on an IP-address of the sender, because of frequent use of IP-spoofing by attackers.

On the definition of important messages: A defender D may characterize the messages that are important to it not by the structure of a message itself, nor by an address of their sender, but by the behavior of their sender, before and during a process whereby the sender sends such messages to D. This behavior may be defined by D as a protocol of sending messages—referred to herein as a law of D, and denoted by $\mathscr{L}_D$.

More specifically, D would declare that messages sent to D, subject to the specified law $\mathscr{L}_D$, are important to D.

For example, a law $\mathscr{L}_D$ may require that before starting to send messages to D, a sender must authenticate itself in a specified manner. This would mean that important messages to D are those sent by a select group of senders that D presumably trusts not to attack it by sending too many messages. In another example, a law $\mathscr{L}_D$ may require a sender to adhere to a rate limiting discipline imposed by D—say, for instance, no more than one message per 5 minutes—which would prevent the sender from sending messages that contribute meaningfully to an attack on D, thus satisfying condition C1. In some implementations, the two preceding examples can be combined into a single law.

On the recognition of important messages sent to a defender D: But such definition of important messages may seem to be absurd—indeed, how can anybody discern a law that governs a process of sending messages by a given sender, and if any such law has been implemented? Yet, this is actually possible. It can be done, in particular, by using a middleware called law-governed interaction (LGI) [5, 3]. Specifically, this middleware features the concept of an $\mathscr{L}$-message, which is a message sent subject to a given LGI-law $\mathscr{L}$, and which can be verified cryptographically as such. Such messages are discussed in Section 2 hereinbelow.

The unequivocal criterion of discrimination proposed herein is whether a message sent to a given defender D has been sent as an $\mathscr{L}$-message, subject to the law $\mathscr{L}_D$ defined by D. The manner in which such messages can be sent, and how they can be recognized as important messages with respect to a given defender, are discussed in Section 2.

It is important to note that this criterion reverses the manner in which defense against DDoS attacks is currently carried out by existing solutions. Conventional defenses operate by trying to recognize attack-packets—and dropping them while letting all other packets pass through. On the other hand, the defense of the present disclosure, based on the criterion of discrimination, recognizes the messages and packets that the defender declared to be important, and lets them pass through. Although the conventional defenses and those described herein are very different anti-DDoS approaches, they are complementary and can be combined, in different ways depending upon a particular defense mechanism used, such as one of two such defense mechanisms introduced hereinbelow.

1.2 State-of-the-Art of Defense Against DDoS Attacks

Before introducing new anti-DDoS defense mechanisms, it is appropriate to review the state-of-the-art of such defenses.

Practically all current defense mechanisms are based on techniques of identifying attack-packets, in order to drop them before they arrive at the attacked defender. The identification of attack-packets is based on an analysis of many past DDoS attacks—using statistical techniques and machine learning—coming up with what is called a signature (or signatures) of attack-packets, defined largely over the content of such packets.

This approach gave rise, recently, to defense by means of scrubbing centers (i.e., scrubbers, for short) [6], operated by commercial companies such as Akamai and Cloudflare. These scrubbing centers operate, essentially, by intercepting messages addressed to a given defender D—their client carrying out deep packet inspection (DPI) of such packets—in an attempt to identify and drop attack packets.

1.2.1 On the Advantages and Drawbacks of Scrubbing Centers

Scrubbing centers provide a decent, although flawed, defense against DDoS attacks. Their biggest advantage is, perhaps, that they can be deployed practically anywhere over the Internet, since they do not depend on any special support of routers. But scrubbers also have several substantial drawbacks, three of which are described below.

(1) Unequal arms race: The ability of a scrubber to defend an attacked site is undermined when confronted with a new kind of attack—because scrubbing is based on an analysis of past attacks, the scrubber may be less effective under a new type of attack. This creates an enduring "arms race" between attackers and the defenders. And it is an unequal arm race, as it is far easier and cheaper to mount a new type of DDoS attack, than it is to incorporate the new type of attack into a new version of the scrubber. Thus, to quote from [6], "we have been losing ground to our adversaries in the DDoS war, and we must take corrective action now".

(2) Unreliability: The underlying purpose of scrubbing is to enable a defender to receive "legitimate" messages and to respond to them. But the ability of scrubbers to satisfy this purpose is unreliable due to a lack of definition of which messages are legitimate with respect to a given defender, and because the process of scrubbing may drop many legitimate messages and packets.

(3) High cost: Scrubbing centers are expensive to operate and thus expensive to be defended by. For example, according to information recently obtained, Akamai charges $1500 per month for the basic service, and significantly more for more advanced levels of service. CloudFlare provides free protection for very small sites, like personal websites, but the price goes up steeply for larger sites. And without an expensive long-term subscription, a site is left basically defenseless. Although some scrubbing centers provide emergency on-boarding during an attack; such on-boarding takes time while the client site remains defenseless, and may carry a hefty fee.

1.3 On the Use of the Local Concept of Important Messages for Defending Against DDoS Attacks Described herein are two defense mechanisms, based on the aforementioned discrimination criterion. The first mechanism is an upgrade of the conventional concept of a scrubbing center. Such embodiments make scrubbing centers more reliable by delivering to a given defender practically all the messages that the defender defined as important. This mechanism may be characterized as a discriminating scrubbing mechanism, to be herein referred to as scrubber++ (with apologies to, or honor of, Bjarne Stroustrup).

The second mechanism to be described below is a brand new mechanism, which depends on a lightweight provision of support by connected routers. It is herein referred to as discriminating anti-DDoS, or DAD, for short.

Although both of these mechanisms are based on the local concept of important messages, and thus share some of their aspects, they are different and each of them has pros and cons. The operation of both mechanisms has been tested and verified by simulation.

The rest of this disclosure is organized as follows: Section 2 introduces the concept of an $\mathscr{L}$-Message, on which the discrimination criterion depends; Section 3 introduces the scrubber++ mechanism; Section 4 introduces the DAD mechanism; and Section 5 concludes this disclosure.

2 The Concept of an $\mathscr{L}$-Message

Definition 1: An $\mathscr{L}$-message is a message sent subject to a LGI law $\mathscr{L}$ such that any receiver of this message can determine, with justified confidence, that the message has been sent subject to this law.

As pointed out in Section 1, an $\mathscr{L}$-message, governed by law $\mathscr{L}_D$, and in turn chosen by a defender D, is the type of message a sender should send to D to ensure delivery of the message to D—particularly during an attack. Such messages addressed to D are denoted as $\mathscr{L}_D$-messages.

The concept of an $\mathscr{L}$-message, as described here, is a part of the middleware called LGI [5], as introduced in Section 1.1. The following section describes how $\mathscr{L}$-messages are sent under LGI, and how they are identified as such.

A note: To use the concept of $\mathscr{L}$-messages described in this disclosure, one does not need to be familiar with the entire LGI mechanism, but such parts of LGI as are described below.

2.1 Sending $\mathscr{L}$-Messages

In order to send $\mathscr{L}$-messages, a sender s must employ a software entity called a private controller of s, denoted by $T_x^{\mathcal{L}}$, which serves as a surrogate of s by mediating the interactions of s with others-subject to a given law $\mathscr{L}$.

Such a private controller can be generated by s via the following two steps: first, by acquiring the use of a generic controller T from a trusted service, called a controller-service (CoS) (cf. Section 2.3). Note that s acquires only the use of T—it does not get T itself, which continues to be maintained by the CoS. A generic controller is built to serve as a surrogate of any given message-sender or message-receiver, subject to any given LGI-law—with no specific laws built into it.

The second step is to load a law $\mathscr{L}$ into this generic controller, thus forming its private controller $T_x^{\mathcal{L}}$. Once this is done, messages sent or received by s via this controller are, by definition, $\mathscr{L}$-messages.

The above two steps describe a manner in which a software process may send $\mathscr{L}$-messages. It is noted that tools can be built to make it easier for a human sender to send such $\mathscr{L}$-messages. In particular, for senders operating via a smartphone, a smartphone application, i.e., an app, can be developed to carry out this process. This functionality has been demonstrated with an experimental smartphone, as described in [1]. In another implementation, a browser-extension can be built to help send $\mathscr{L}$-messages via a web browser.

2.2 Authenticating an $\mathscr{L}$-Message

It should first be noted that every LGI-controller carries a certificate signed by the controller service (CoS) acting as a certification authority (CA), which, in effect, vouches for the controller's authenticity. The authentication may be done by means of a TLS handshake between the controller and the receiver of a message, assuming that the receiver does not also operate via an LGI-controller, in which case, a different type of handshake may be used. During this handshake, the receiver of the message may obtain the certificate from the controller and validate the certificate to ensure that it is signed by the CoS. In an embodiment, the validation of the certificate signed by the CoS requires the receiver to have the public key of the CoS. The receiver may also obtain the one-way hash of the controller's law. A symmetric encryption key for a particular session may also be established during the handshake. The key exchange may be based on the Diffie-Hellman key exchange algorithm. It should be noted that the receiver gets the message itself only if the handshake succeeds.

2.3 A Controller Service (CoS)

To support a large number of senders of $\mathscr{L}$-messages, which may operate under a variety of laws, implementations may provide a large set of generic controllers that can be widely trusted to operate in compliance with any valid law loaded into them. As pointed out above, such a provider of controllers is referred to as a controller service (CoS). The CoS's function is to create, maintain, and certify a collection of controllers. The certification may be done by providing each controller with a certificate of its authenticity, signed by the CoS. Further, the CoS may be geographically distributed.

The current implementation of LGI includes an experimental version of a CoS. In an implementation, embodiments utilize a large-scale CoS that vouches for the trustworthiness of its controllers. Such a CoS may be managed by a reputable organization. Such an organization may be a commercial company, that would demand a small fee for acquiring its controllers; or it may be a governmental institution which would provide its controllers for free, in order to help protect against DDoS attacks.

Finally, it should be pointed out that controllers maintained by the CoS can be used by many other applications besides defending against DDoS attacks, such as making heterogeneous distributed systems dependable [4]; and building decentralized social networks [8]; amongst other examples.

2.4 On the Nature of the Laws That Can Define Locally Important Messages

Besides providing an unambiguous criterion for the identification of $\mathscr{L}$-messages addressed to a defender D), a law $\mathscr{L}$ must satisfy condition C1 stated in Section 1.1.

Following are three types of measures that can be implemented by a law $\mathscr{L}$ for providing these benefits, namely, (1) rate control, (2) certification, and (3) posing challenges.

Such measures may be implemented either separately, or in various combinations. (Rate control and certifications are mentioned, briefly, in Section 1 hereinabove.)

It is worth pointing out that although some of these measures, like the authentication of the sender, are computationally quite expensive, the computations are to be done by the controller and, perhaps, by the sender; thus, routers are not required to perform such computations.

(1) Rate control: This may be done by having a law $\mathscr{L}$ impose an upper bound on the rate of messages that $\mathscr{L}$-agents can send to D. This is a measure that can be implemented in several ways. It should be noted, however, that implementations cannot control the rate of messages sent by a sender to a controller. However, the controller can limit the rate of messages forwarded to the defender D.

One variant of the rate control measure is the following: initially, every sender s operating under the given law $\mathscr{L}$ may be authorized to send just one message to D. But D can enable x to send more messages to D by sending x, and a controller of x, an indication of a rate that it is allowed to use.

(2) Certification: A law may be written to require a sender that tries to adopt the law to authenticate itself via one or several certificates. For example, one of these certificates may be provided by D itself for its best customers. And supposing, for instance, that D is a military site, another certificate may be required to authenticate a security classification level of the sender.

If the sender fails to provide the required certification, then it will not be able to send messages subject to this law.

It should be noted that a defender D that has large numbers of clients and employees may like to curtail the number of important messages that can be sent to it. This can be done by having its law $\mathscr{L}$ require certification via a certificate that D will provide its most important clients, employees and peers. This may be in addition to imposing rate limits on all such senders.

(3) Posing challenges: A law can be written to pose various challenges to the sender of a message to verify its identity. It can, for example, specify that a sender successfully solve a captcha puzzle to ensure that the sender is a person.

2.4.1 Comments About Usage

First, it is expected that most users will send their $\mathscr{L}$-messages to defenders via tools developed in browsers and smartphones, as described above. Second, of the three measures described above, it is expected that the rate-control measure will be used most frequently in $\mathscr{L}$-messages. On the other hand, certification is likely to be used in such laws mostly for employees of D, or for its key clients, and peers. Third, a defender may define several laws for sending messages that it considers important, but for simplicity, it is herein assumed that each defender defines just a single such law.

2.5 Example Method of Defending Against DDoS Attacks

FIG. 1 is a flow diagram illustrating an example method 100 of defending a server against DDoS attacks according to an embodiment. The method 100 includes obtaining an indication 110 of packets defined as important by a defending server. The method 100 further includes defining a discrimination criterion 115, the discrimination criterion being a mechanism to identify packets complying with the obtained indication 110. The method 100 continues by obtaining packets 120, and subsequently, for each obtained packet, controlling transmission 130 of the packet to the defending server based on a verification, using the discrimination criterion, that a sender of the packet complies with the obtained indication 110. The method 100 thereby defends the server from DDoS attacks.

It should be noted that a packet can be said to comply with the obtained indication 110 if a sender of the packet complies with the obtained indication 110 while sending the packet. As such, an origin of the packet is a characteristic of the packet that determines whether or not the packet is compliant. However, as described in Section 1.1 above, once a packet is sent, existing solutions are unable to discern the origin of the packet. However, the mechanism of the discrimination criterion, as described herein, enables discernment of the origin of the packet, i.e., as to whether it was sent by a compliant sender, and thus, whether the packet itself can be said to be compliant.

3. Scrubber++: A Discriminating Scrubbing Mechanism

One of the drawbacks of conventional scrubbing centers (or scrubbers, for short), as mentioned in Section 1.2, is their lack of reliability, in that they are likely to drop some legitimate packets—i.e., packets that a defender would like to receive. Conventional scrubbers cannot adequately address this issue, because they have no way of knowing which packets a given defender would like to receive.

As such, the reliability of a conventional scrubbing center can be enhanced by having the scrubbing center adopt the concept of locally important messages as described herein, and use it to form a scrubbing++ center, or scrubber++, for short. Scrubbing++ centers are introduced briefly hereinabove, and described in more detail in the paragraphs that follow.

The rest of this section is organized as follows: Section 3.1 describes the gist of scrubber++, as denoted by S; Section 3.2 discusses preparations of a site for becoming a defender protected by S; Section 3.3 discusses the sending and transfer of $\mathscr{L}_D$-messages to a defender; Section 3.4 discusses defending the scrubber++ itself; and Section 3.5 is a summary of the defense provided by the scrubber++.

3.1 The Gist of the Scrubber++ Mechanism

The purpose of this mechanism is twofold. First, the scrubber++ mechanism ensures that practically all $\mathscr{L}_D$-messages sent to a given defender D, which D defined as important, would be delivered to D. The second purpose is to employ a conventional scrubber to drop attack-packets sent to D, provided that they do not belong to $\mathscr{L}_D$-messages—this would enable D) to read and respond to the important messages that it received.

A scrubber++ (denoted by S) is essentially an upgrade of a conventional scrubbing center (denoted by SC). S is formed by appending to SC an application called an appendix (denoted by P), designed to handle $\mathscr{L}$-messages that arrive at P. P accepts such messages via its own port p—this port may be selected randomly and may be changed periodically.

The main task of the appendix, relative to a given defender D registered therein, is to verify that the $\mathscr{L}$-messages addressed to D are $\mathscr{L}_D$-messages, where $\mathscr{L}_D$ is the law defined by D to characterize the messages that D considers important. Such messages are to be sent to D, while the other messages addressed to D are to be dropped.

And for the appendix to get all the $\mathscr{L}_D$-messages sent to it, the scrubbing center SC, on which S is based, is configured to avoid scrubbing messages addressed to P, in order to prevent packets sent to P from being dropped.

3.1.1 The Infrastructure of the Scrubber++ Mechanism

The operations of a scrubber++ S involve two additional components: (1) the registry, and (2) the controller service (CoS). They are discussed briefly below.

(1) The registry: The registry is the administrative center of a scrubber++ S, whose functionality is described later. The registry may reside in SC itself, or elsewhere.

(2) The controller service (CoS): The CoS was introduced in Section 2.3 as potentially serving many types of applications. But here it is assumed, for simplicity, that a CoS serves only a single scrubber++ S.

3.2 Preparing for Defense

Implementations of the scrubber++ mechanism include the following steps to be carried out for a website D) to be defended by a scrubber++ S: (1) defining a defense law $\mathscr{L}_D$; (2) providing information to the registry; (3) registering D as a defender; and (4) providing information to the appendix P. These steps are discussed below.

(1) Defining a defense law $\mathscr{L}_D$: It should be pointed out that a single defender can specify several laws that define different types of message-sending behaviors that the defender considers important. For the sake of simplicity, only implementations including a single such law per defender are discussed here.

There are two ways for a defender D to come up with a law. One way is for D to define its own law, or have somebody else write a law for it. The other way is to adopt a law that somebody else defined. In an embodiment, the registry has a list of laws that its clients—the registered defenders—use. It is worth pointing out that the law that a given defender D is using, as its $\mathscr{L}_D$, does not need to be a secret, as the knowledge of $\mathscr{L}_D$ cannot help in attacking D.

(2) Providing information to the registry: In implementations of the scrubber++ mechanism, the following information is provided to the registry: (a) the IP-address of site D, and its URL; (b) the text of its law $\mathscr{L}_D$; and (c) the pair [D),H($\mathscr{L}_D$)], where H($\mathscr{L}_D$) is the one-way hash of its law $\mathscr{L}_D$.

(3) Registering D as a defender:

Registration is important because only registered sites would be defended by the scrubber++ in question; and a request by D) to register needs to be approved by the registry.

The details of such an approval are left open, to be decided for a specific implementation, but it may rest on several considerations, such as the following: (a) the nature of the candidate D, who may be required to be of a substantial size or importance, and to reside at the vicinity of S; (b) paying a required fee, or signing a contract for doing so; (c) the nature of the law $\mathscr{L}_D$ defined by the candidate—for example, the registry may require that this law limits the frequency of $\mathscr{L}_D$-messages sent to D to be lower than an upper bound specified by the registry; and (d) the registry may have an upper bound for a number of sites that it can register. If the registration request is not approved, then the information submitted to the registry by step (2) above may be erased.

(4) Providing information to the appendix: For each registered defender D), the registry may disseminate the pair [D),H($\mathscr{L}_D$)] to the appendix.

The registry may also provide the appendix with the public key of the CoS, to be used for decrypting the certificates signed by the CoS, and planted in the controllers managed by the CoS. How this information should be provided to the appendix is beyond the scope of the present disclosure.

It is worth pointing out that at least portions of this information may be transferred, in various ways, to other parts of the system in question: including the CoS, the private controller managed by the CoS, and even senders of $\mathscr{L}$-messages.

3.3 The Sending of an $\mathscr{L}_D$-Message and its Transfer to D

The act of sending an $\mathscr{L}_D$-message is described in Section 2, but the sending of such a message under the scrubber++ mechanism differs in the following way: such a message should be addressed not to the scrubbing center SC that serves as the basis for a scrubber++ mechanism, but to its appendix P, which operates via its own port p. Amongst other examples, such a change in the sending of $\mathscr{L}_D$-messages may be set up in a browser extension and in a sending app on a smartphone (cf. Section 2).

3.3.1 The Treatment of Messages Arriving at the Appendix

First, it should be recalled that in implementations of the scrubbing++ mechanism, messages arriving at the appendix are not being scrubbed (cf. Section 3.1). So, it can be assumed that practically all the $\mathscr{L}$-messages sent to the appendix will arrive there. Also, recall that P has in its possession the list of pairs [d,H($\mathscr{L}_d$)], one for every defender D.

A message m addressed to a site x and arriving at the appendix P would be sent to x if the following two conditions are satisfied: (1) x is a registered defender D; and (2) m is an $\mathscr{L}_D$-message, namely, it is an important message for D. Otherwise, message m would be dropped. Now, the two conditions above can be verified in the following manner:

Condition (1) is satisfied if there is a pair (x, H($\mathscr{L}_x$)) in the list of pairs [d, H($\mathscr{L}_d$)].

And condition (2) is satisfied if item H(x) in the pair (x, H($\mathscr{L}_x$)) is the same as the hash H of the law of the sending controller, as obtained by the handshake between the controller and P, as discussed in Section 2.2.

3.4 Defending the Scrubber++ Itself

The three main components of a scrubber++, namely its appendix P, its CoS, and its registry, can be defended against DDoS attacks inflicted thereupon. It is assumed that the scrubbing center SC itself has sufficient computing power to withstand practically all DDoS attacks.

First, the harder and more important defense, namely, of the appendix, is discussed, followed by the respective defenses of the CoS and the registry.

3.4.1 Defending the Appendix of S from DDoS Attacks

Attackers are likely to discover the existence of the appendix and its role. So, if port p is fixed for a long enough time, attackers would eventually discover it, and may mount an attack on it.

This issue may be resolved by making p change dynamically, and in a manner that makes such changes hard to discover, or predict. This may be done, for example, by one of the following two strategies: (1) a base strategy, and (2) an elaboration of the base strategy.

(1) The base strategy: The port number p of appendix P may be changed regularly, in randomized intervals, as follows: consider a time t1 when P starts to operate under port p1. P may be configured to send to the CoS the following message at time t1: (p1,t1+dt,p2), which means, essentially, the following: the current port number is p1, it would change at time t1+dt to p2. Consequently, both P and the CoS would change the port number to p2 at time/1+dt. The time period dt should satisfy two conditions: (a) dt should be smaller, e.g., half, of the estimated time that it takes for attackers to mount a new attack with a new port number; and (b) dt should be randomized. This transformation of port numbers may be repeated recursively.

Now, when the CoS changes the port number of P, there are likely to be several controllers that still operate with the older port number. The CoS may, therefore, be programmed to send an instruction to each of these controllers to update its port number. However, this would take some time, during which a controller may send $\mathscr{L}$-messages to P, messages that would be lost because they are addressed to a wrong port. Most of these losses can be prevented by the following elaboration of the base strategy.

(2) An elaboration: When P changes its port number to p2—considering, again, the first change made to the port number—P leaves port p1 to operate. In other words, we will have two instances of P operating at the same time. We call them $P_{previous}$, operating via port p1, and $P_{current}$, operating via port p2.

As such, messages sent by controllers that still use port p1 will arrive at $P_{previous}$ and will be handled by it. This situation can be maintained invariant of the sequence of port numbers selected by P. Moreover, the scrubbing center SC on which S is based would avoid scrubbing messages addressed to both these versions of P.

It should be noted that although unlikely, the attackers may still manage to mount an attack, but such an attack can last for only brief amounts of time, due to the relentless changes of the port numbers under which P operates.

3.4.2 Defending the CoS and the Registry Against DDoS Attacks

For the CoS to be used by the senders of $\mathscr{L}$-messages to P, the CoS should be defended against DDoS attacks. The CoS cannot be defended by means of S, because S enables messages to get through only if they are $\mathscr{L}$-messages, sent via a controller acquired from the CoS, and a regular message needs to be sent to the CoS in order to initially acquire a controller. Further, if the CoS is defended by S, the packets of such a message may be dropped. Therefore, the CoS should be defended via one of the conventional scrubbing centers, such as SC itself.

The registry, if it does not reside in the scrubber SC, should also be defended, and it can be defended by the scrubber++ S or by the base scrubbing center SC.

3.5 The Defense by Scrubber++: a Summary

Scrubber++ provides two complementary defenses to registered defenders. One is the assurance to a defender D that it will receive practically all the $\mathscr{L}_D$-messages sent to it. The other defense, carried out by underlying scrubber SC, is the dropping of a large number of attack-packets, which should enable D to read the $\mathscr{L}_D$-messages it gets, and to respond to them.

It should be noted that besides the $\mathscr{L}_D$-messages, D may receive messages formed from packets that are not dropped by SC and are useful for D, despite not having been defined by D as important.

Figure 2:
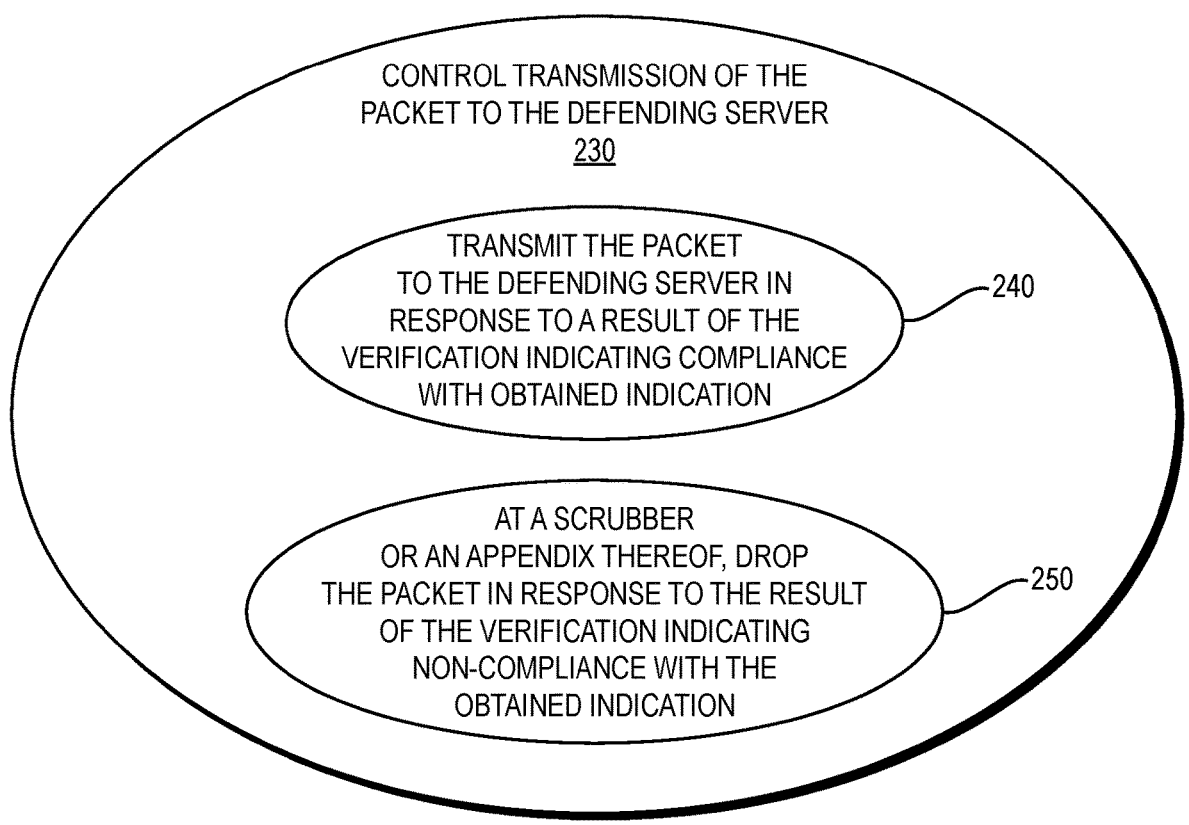
FIGS. 2-4 are flow diagrams illustrating various example methods of controlling transmission of obtained packets in embodiments.

3.6 Example Method of Controlling Transmission of Obtained Packets Via the Scrubbing++ Mechanism FIG. 2 is a flow diagram illustrating an example method of controlling transmission 230 of a packet to a defending server. The method 230 is an example implementation of the step of controlling transmission 130 of packets to the defending server, as shown in FIG. 1. The method 230 includes transmitting the packet 240 to the defending server in response to a result of the verification indicating compliance with the obtained indication 110. The method 230 also includes, at a scrubber or an appendix thereof, dropping the packet 250 in response to the result of the verification indicating non-compliance with the obtained indication 110. The method 230 is thus an example implementation of the scrubber++ mechanism.

It should be noted that, for scrubber++, the indication of packets that a defender defines as important, as introduced in step 110 of FIG. 1, includes the hash of an LGI-law under which such an important packet has been sent, as the enhanced scrubber is configured to compare such a hash of an LGI-law adopted by a controller relaying the message from a sender of the packet, with a hash of an LGI-law specified by the defending server, as described in more detail above in Section 2.2 and Section 3.3.1. The scrubber++ mechanism thereby determines whether messages composed of such packets are in fact $\mathscr{L}$ messages. As such, the scrubber++ defense operates based upon whether a given packet is desired, i.e., considered important, by the defender.

4 A Router-Based Discriminating Anti-DDoS (DAD) Defense Mechanism

The fundamental difference between the DAD mechanism and scrubber++ is that, unlike scrubber++, DAD relies on support from routers. Despite this difference, there are considerable similarities between these two mechanisms. A first similarity is the reliance of both scrubber++ and DAD on the same criterion of discrimination between messages the defender considers important and all other messages. A second such similarity is the use of a modified scrubber to support a part of the functionality of DAD.

The rest of this section is organized as follows: Section 4.1 discusses an incremental approach for recruiting routers, in a given domain of the Internet, for participating in the DAD mechanism, and the nature of support that such routers would be required to provide for such defense. Section 4.2 presents the gist of the DAD mechanism. Section 4.3 describes the infrastructure of DAD. Section 4.4 describes the preparation that a given site makes in order to be defended by DAD. Section 4.5 describes the ingress of i-packets and u-packets into routers. Finally, Section 4.6 describes the DAD defense mechanism itself.

4.1 The Routers

The DAD mechanism requires only lightweight support by the routers in its domain of operation—much lighter, for example, than the support by routers required by the well-known pushback mechanism [2]. This should facilitate recruitment of a set of routers to participate in the operation of DAD, as discussed in Section 4.1.1. The support required by DAD from routers is described in Section 4.1.2.

4.1.1 The Expected Domain of DAD, and the Incremental Recruitment of Routers

A main goal regarding deployment of the solutions disclosed herein is to be able to defend sites all over a desired area, e.g., the 48 contiguous states of the U.S. via the DAD methodology. This may follow the implementation of DAD in the rest of North America, in Hawaii, and perhaps in other places where one can trust the management of routers. Satisfying such a goal requires the core routers in this vast region, e.g., the U.S., to support DAD. This is very unlikely to happen in one fell swoop. Recruitment may thus start incrementally, by having DAD operate in a smaller region.

A reasonable choice is a set of the core routers in one autonomous system (AS), managed by a given ISP. Such an autonomous system may be referred to herein simply as ISP, which is a much better-known term than "AS." This disclosure is presented in terms of a single such ISP, assumed to satisfy the requirements of DAD.

Given such an ISP, DAD is able to defend sites anywhere in the domain of the ISP, while senders of messages to such sites can reside anywhere on the Internet. The domain of the ISP is also referred to herein simply as "the domain."

A plan for incremental recruitment may be based on the following observation: if the DAD mechanisms can be proven effective in a single particular ISP, it would likely create pressure on other ISPs to provide the required support for DAD, because the sites residing in the domains of other ISPs are likely to exert pressure on their ISPs to support DAD. Moreover, these sites in other domains may offer to pay their ISP to support DAD, thus creating a direct financial incentive. So, it can reasonably be expected that the various ISPs in a region, e.g., the 48 contiguous states of the U.S., would eventually and incrementally support DAD's requirements. Moreover, DAD can operate on any collection of ISPs that are pairwise contiguous with each other.

4.1.2 The Requirements of DAD from the Routers that Support It

Described here are various requirements that DAD makes from routers of a domain in which DAD is being implemented. Such description seeks to distinguish between structural and behavioral requirements of DAD.

The Structural Requirements Include the Following:
(1) The header of every packet has a field, e.g., a one-bit field, which may be called a pass-field. Such a pass-field is considered to be "on" if its value is 1, and "off" when its value is 0. A packet with a pass-field "on" is called an i-packet, and a packet with a pass-field "off" is called a u-packet. (The significance of the terms i-packet and u-packet is described further hereinbelow). If adding a field to the header of a packet would slow the router by a significant amount, then the pass-field may reside in the data part of a packet, which should not be encrypted. It is assumed here that the pass-field resides in the headers of respective packets.

(2) Routers in an ISP's domain include an associate, called a supplement, with its own processor. The function of the supplement includes performing authentications, as such authentications may be computationally expensive, and the supplement is not involved in routing.

(3) Routers in an ISP's domain contain a list of identifiers of the defenders in that domain that are under attack. Such a list may be called the attacked list.

The Behavioral Requirements Include the Following:

(1) Each router is configured to make packets arriving at it from the outside, rather than from another router in its domain, into u-packets-unless the packets belong to $\mathscr{L}$-messages.

(2) If a defender notifies the routers that it is under attack, then the routers will drop all the u-packets addressed to this defender.

(3) Some minor requirements related to the above, for example, include that routers be configured to accept a defender's notification that it is under attack.

4.2 The Gist of DAD

The packets that flow through the routers of a given domain may be designated as two types, called i-packets and u-packets. These two types of packets differ by a value contained in a pass-field. The pass-field may be a single-bit field, making it easy to distinguish between the two types of packets. The semantics of these two types of packets be can be expressed by considering the following three cases:

(1) Packets addressed to a registered defender D that belong to messages that D considers important are i-packets.

(2) Packets addressed to a registered defender D that do not belong to messages that D considers important are u-packets.

(3) Packets addressed to a site that is not a registered defender are also u-packets.

DAD offers two kinds of defenses, called the inherent defense and the active defense, respectively. The former is inherent in the flow of packets and is automatically available to all registered defenders—but it is rather weak and may not be sufficient in many cases. The latter is carried out by actively dropping the u-packets addressed to defenders under strong attacks.

4.3 The Infrastructure of DAD

Besides the routers in the given domain, DAD includes three additional components: a CoS, a registry, and a guard. These additional components may be described as follows.

4.3.1 The Controller Service (CoS), and Its Defense

The CoS, as introduced in Section 2.3, is resident within a given domain. The CoS can be defended against DDoS attacks, but due to considerations analogous to those in Section 3.4.2, the CoS cannot be defended by DAD, which uses the CoS for its operation, so it is defended either by a conventional scrubber or by the scrubber++ mechanism described herein.

4.3.2 The Registry

A DAD-registry, or simply registry, serves as the administrative center of DAD. Its functionality is almost identical to that of the registry of scrubber++, as described hereinbelow in Section 4.4.

Like the CoS, the registry is resident within the given domain, and is defended against DDoS attacks. Unlike the CoS, the registry can be defended via DAD. It can also be easily replicated, because changes in the content of the registry are relatively rare-thus making the registry even more secure.

4.3.3 The Guard

A guard is a device that handles $\mathscr{L}$-messages. The guard is very similar, but not identical, to the appendix of the scrubber++. Like the appendix, the guard is an application that resides in a conventional scrubber—which is resident in our domain. (A scrubber having such an application configured for use as a guard in DAD may be referred to herein as a "guarding node.") Also like the appendix, the guard verifies that an $\mathscr{L}$-message addressed to a defender D under attack is an $\mathscr{L}_D$-message. The guard additionally protects itself against DDoS attacks, just as the appendix does (cf. Section 3.4.1).

However, the handling of $\mathscr{L}$-messages by the guard differs from that of the appendix of a scrubber++ in that, while the appendix forwards $\mathscr{L}$-messages, verbatim, to their destination, or drops them, the guard forwards all messages, after marking their packets as i-packets or u-packets. Such an implementation is described in Section 4.5.

Also, the routers in the given domain need to trust the guard. One way to gain such trust is to authenticate the guard via public-key cryptography. The authentication itself will not be elaborated upon here, but an issue that may be raised by such authentication will be described, along with a potential solution of said issue.

The aforementioned issue is that public-key authentication is computationally expensive, probably too expensive for routers to carry out. However, such authentication can be done by having an autonomous component built into each router, with its own processor. This component, which may be called a supplement of the router, would carry out the authentication of the guard, and would not be involved in routing. Such a supplement of the router may be required in implementations of the DAD defense.

4.4 Preparation, by a Given Site, for its Defense

Implementations of defending a site D by the DAD mechanism include the following steps:

(1) D defines a defense law, i.e., the LGI-law $\mathscr{L}_D$ that would serve as basis for identifying the messages that D views as important.

(2) D provides certain information to the registry.

(3) D registers in the DAD-registry as a defender.

(4) The registry provides certain information to the guard.

The first three steps above are identical to the three steps of preparation for defense under the scrubber++ mechanism (cf. Section 3.2), while the fourth step differs in that it provides information to the guard—a component of the infrastructure of DAD—instead of the appendix under scrubber++.

4.5 The Ingress of I-Packets and U-Packets into Routers

DAD ensures that only i-packets and u-packets are admitted to the routers of the given domain, whether these packets originate in $\mathscr{L}$-messages, or not. Described below, respectively, are the ingress of packets originating from $\mathscr{L}$-messages and thus to be designated as i-packets, and the ingress of packets arriving from all other sources and thus to be designated as u-packets.

4.5.1 The Ingress of I-Packets and U-Packets Included in L-Messages

Consider an $\mathscr{L}$-message m, addressed to a site x, that arrives at the guard. The packets of m will be sent to x either as u-packets or as i-packets depending on the following three conditions:

(1) If x is not a registered defender, then the packets of m will be sent to x as u-packets.
(2) If x is a registered defender, say D, but m is not an $\mathscr{L}_D$-message—that is, m is not one of the important messages for D—then the packets of m will be sent to D as u-packets.
(3) If x is a registered defender, say D, and m is an $\mathscr{L}_D$-message, then the packets of m will be sent to D as i-packets.

4.5.2 The Ingress of U-Packets of Other than $\mathscr{L}$-Messages

By their definition, the packets that do not belong to $\mathscr{L}$-messages are to be u-packets. So, implementations ensure that such packets contain a pass-field, and that its value is zero.

Ways in which a packet p may arrive at a router R in a given domain include the following:

(1) p may arrive from another router R' in the given domain.
(2) p may arrive from a router R" outside of our domain.
(3) p may be submitted to R directly from a sender—not from another router.

Nothing needs to be done in case (1), because packet p already has a pass-field. In cases (2) and (3), router R performs the following steps: (a) add a pass-field to p; and (b) set the value of this pass-field to zero, making p into a u-packet.

An observation: Most often, when a packet p is sent from a router $\mathscr{P}$ to another router R2 in the same domain, it will pass through a sequence of routers within this domain, but this may not always be the case. That is, p may be transferred to a router R3 not in this domain, and from R3, after a while, to R2. The danger is that while in R3, the pass-field of p may be manipulated or removed. However, this is highly unlikely unless R3 is a rogue router, and routers are generally not rogue.

4.6 The DAD Defense Mechanisms

DAD offers two kinds of defenses, called an inherent defense and an active defense, respectively. The former is inherent in the flow of packets and is automatically available to all registered defenders—but it is rather weak and may not be sufficient in many cases. The latter, active, defense is carried out by dropping the u-packets addressed to defenders that invoke this kind of defense.

4.6.1 Inherent Defense

Since DAD does not drop any packets—unless instructed to do so, as part of the active defense—there will be an uninterrupted flow of i-packets and u-packets to the various registered defenders (u-packets will also flow to non-defenders, but this is of no importance to them). And the very ease of discrimination between these two types of packets is useful for defenders, whether there are under attack, or not.

A defender under attack may try to defend itself by recognizing quickly the u-messages and dropping them, thus gaining the ability to deal with the messages formed from i-packets, which it views as important. However, the attack may be too strong for a defender to be able to operate in this way. In this case, the defender can invoke the active defense.

Even a defender not under attack may also benefit from the ease of discriminating between these two types of packets, because the ease of discrimination would enable such a defender to identify the packets that belong to $\mathscr{L}_D$-messages—which the defender may view as particularly important to focus on.

4.6.2 The Active Defense

DAD provides an active defense stage, called DAD1, that can be invoked to defend any given registered defender that feels that it is under an attack that it cannot handle by itself. Before outlining the operations of DAD1, it should be recalled that every router in a given domain is configured (cf. Section 4.1.2) to maintain a list, called an attacked list, of identifiers of the defenders that are under attack. As further described hereinbelow, this list is populated upon invocation of the active defense by the defenders under attack.

DAD1 operates at routers of the given domain, e.g., all of the routers of the given domain, in the following manner: at each router, DAD1 drops all u-packets addressed to every defender on the attacked list. This dropping is done at the very ingress of these packets to the routers.

The dropping of u-packets at their very source has two important consequences. First, it eliminates the clogging of routers with u-packets, which would otherwise be allowed to flow over the system of routers, slowing down the flow for all entities deployed upon or otherwise set up to access the network.

The second consequence of dropping u-packets at their source is potentially much more important. Dropping packets at their source enables the identification of the members of an attacking botnet—when the dropped packet is, in fact, an attack packet. Indeed, with careful analysis of the Internet traffic towards the members of the botnet in question, one may be able to identify the mastermind, or masterminds, of the botnet—the real attackers—and perhaps take them down. This potential may even prevent attacks on sites within the given domain altogether, because would-be attackers might be concerned about the potential of being discovered. Furthermore, DAD1 enables such discovery of active attackers to occur immediately upon activation of the DAD1 defense, in contrast to conventional scrubbing centers, which generally detect an attack based upon analysis of a collection of data built up over a period of time. Thus, DAD1 provides an ability to catch active attackers in the act, thus drastically facilitating identification of such attackers.

Two additional issues regarding the active defense are discussed in the two paragraphs below.

(1) The invocation of DAD1: A defender D that detects that it is under an attack, which is too strong for D to handle by itself, will send an initial activating command such as "invoke DAD1" to the registry. The registry, in turn, will send a subsequent activating command such as "protect D" to every router in the given domain. (The sending mechanism to all the routers in the given domain is left unspecified because it depends on the ISP that manages these routers.) In response to receiving the "protect D" command, each router adds D to its attacked list introduced in Section 4.1.2.

(2) Stopping the defense of a given defender: First, it is noted that in an embodiment, the deactivation of DAD1 is done as soon as possible after the attack concludes, so as to prevent D from losing u-packets that may be of interest to D, e.g., a packet from a new user, and that D can process when not under an attack.

How can D detect the conclusion of such an attack? After all, D will not receive any u-packets once DAD1 is invoked, and D will continue not to see any, after the conclusion of the attack, until DAD1 is deactivated. Moreover, the routers close to D will be in a similar bind, because they will experience much lower congestion once DAD1 has started to drop packets addressed to D.

One solution to this problem is that D can deactivate DAD1, as a test, periodically, for example, every hour. If D then detects an attack, D will invoke DAD1 again. If there is no attack, then deactivation is done.

Another potential solution is for the routers to report periodically to the guard the number of packets addressed to D that they have handled. The guard, in turn, can analyze these reports to determine whether or not the attack is over.

Figure 3:
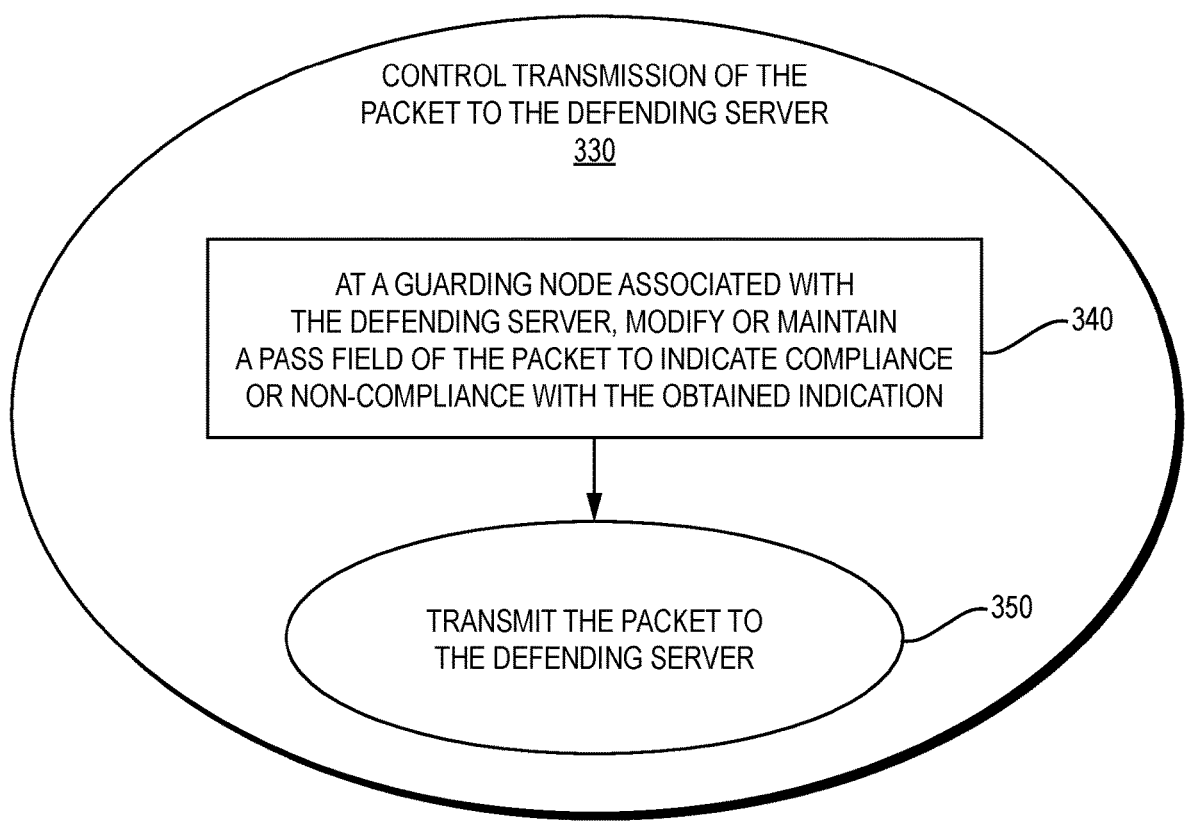

4.7 Example Methods of Controlling Transmission of Obtained Packets via the DAD Mechanisms FIG. 3 is a flow diagram illustrating an example method of controlling transmission 330 of a packet to a defending server. The method 330 is an example implementation of the step of controlling transmission 130 of packets to the defending server, as shown in FIG. 1. The method 330 includes, at a guarding node associated with the defending server, modifying or maintaining a pass field 340 of the packet to indicate compliance or non-compliance with the obtained indication. The method 330 subsequently includes transmitting the packet 350 to the defending server. Such a method 330 thus is an example implementation of the DAD mechanism, specifically, of the inherent defense. The method 330 therefore relies on the defending server to prioritize, or even to choose whether to view or ignore, packets, or full messages composed of packets, based on a value of a pass field of the packet or message.

Figure 4:
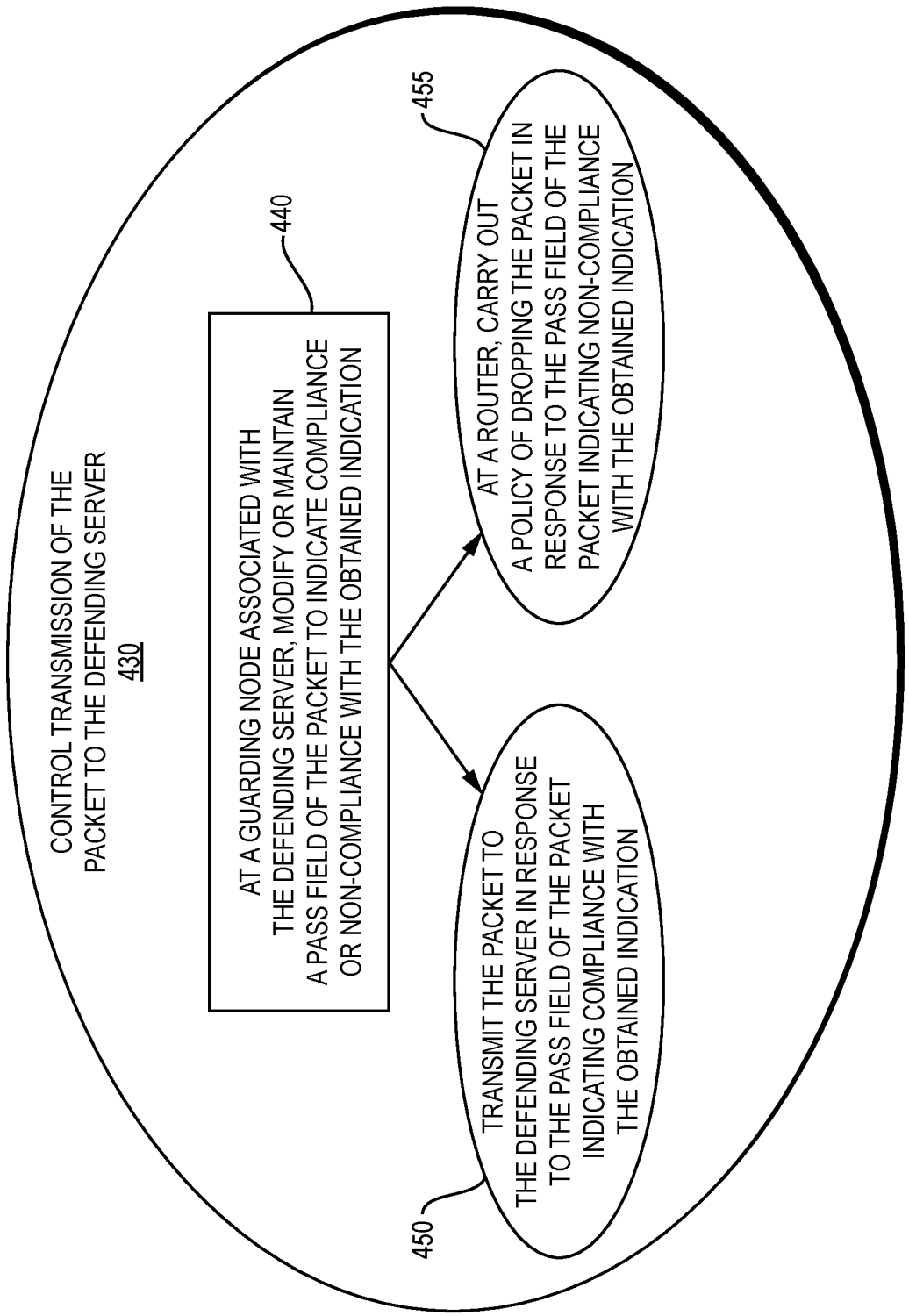

FIG. 4 is a flow diagram illustrating an example method of controlling transmission 430 of a packet to a defending server. The method 430 is an example implementation of the step of controlling transmission 130 of packets to the defending server, as shown in FIG. 1. The method 430 includes, at a guarding node associated with the defending server, modifying or maintaining a pass field 440 of the packet to indicate compliance or non-compliance with the obtained indication. Such functionality 440 may include setting the pass field to 1 where the packet complies and setting the pass field to 0 where the packet does not comply. In an embodiment, compliance may be determined using the discrimination criterion. The method 430 subsequently includes transmitting the packet 450 to the defending server in response to the pass field of the packet indicating compliance with the obtained indication 110. In a parallel path also subsequent to the step 440, the method 430 includes, at a router, carrying out a policy of dropping the packet 455 in response to the pass field of the packet indicating non-compliance with the obtained indication 110. Such a method 430 thus is an example implementation of the DAD1 mechanism, specifically, the active defense. The method 430 relies on support from a router to transmit or drop packets, or full messages composed of packets, based on a value of a pass field of the packet or message.

It should be noted that, for the DAD and DAD1 defenses, the indication of packets that a defender defines as important, as introduced in step 110 of FIG. 1, includes the pass field as described above. The DAD and DAD1 mechanisms thereby determine whether messages composed of such packets are in fact $\mathscr{L}$-messages. As such, the DAD and DAD1 defenses, like the scrubber++ defense, operate based upon whether a given packet is desired, i.e., considered important, by the defender. Such functionality operates so that if a given packet is considered important to the defender, the packet is sent to the defender, otherwise, at default, a packet is considered unimportant and dropped.

5 Conclusion

This disclosure introduces an unequivocal criterion of discrimination between two kinds of messages and packets: those that are defined as important by a given defender, and those that are not. This criterion gives rise to two novel and very different defense mechanisms.

One of them, referred to herein as scrubber++, is implemented by upgrading one or more conventional scrubbing centers. The advantage of this mechanism is that it ensures the delivery of practically all messages addressed to a defender D), which D defined as important to receive. Therefore, the scrubber++ mechanism mitigates the unreliability of conventional scrubbing centers described hereinabove (cf. Section 1.2.1).

The other mechanism, called DAD, utilizes lightweight support by routers. Like scrubber++, DAD ensures the delivery to any defender D of practically all messages that D considers important. DAD has several additional advantages, as follows:

(1) The dropping of u-packets addressed to any defender under attack-dropping at their source—enables the identification of the members of the attacking botnet. This can help identify the mastermind, or masterminds, that start such an attack. This capability may make would be attackers reluctant to start an attack for fear of being discovered.

(2) The dropping of u-packets at their source can eliminate the clogging of routers with u-packets, which would otherwise be allowed to flow in the system of routers.

(3) DAD provides broad, relatively cheap, and enduring support for all registered sites resident in a given domain, and there can be many such registered sites.

However, DAD has limited applicability, as it can be used only in a region where it can get the support of routers. On the other hand, scrubber++ can be deployed practically everywhere over the Internet, which is a huge advantage of the scrubber++ mechanism.

Computer Network Operating Environment

Figure 5:
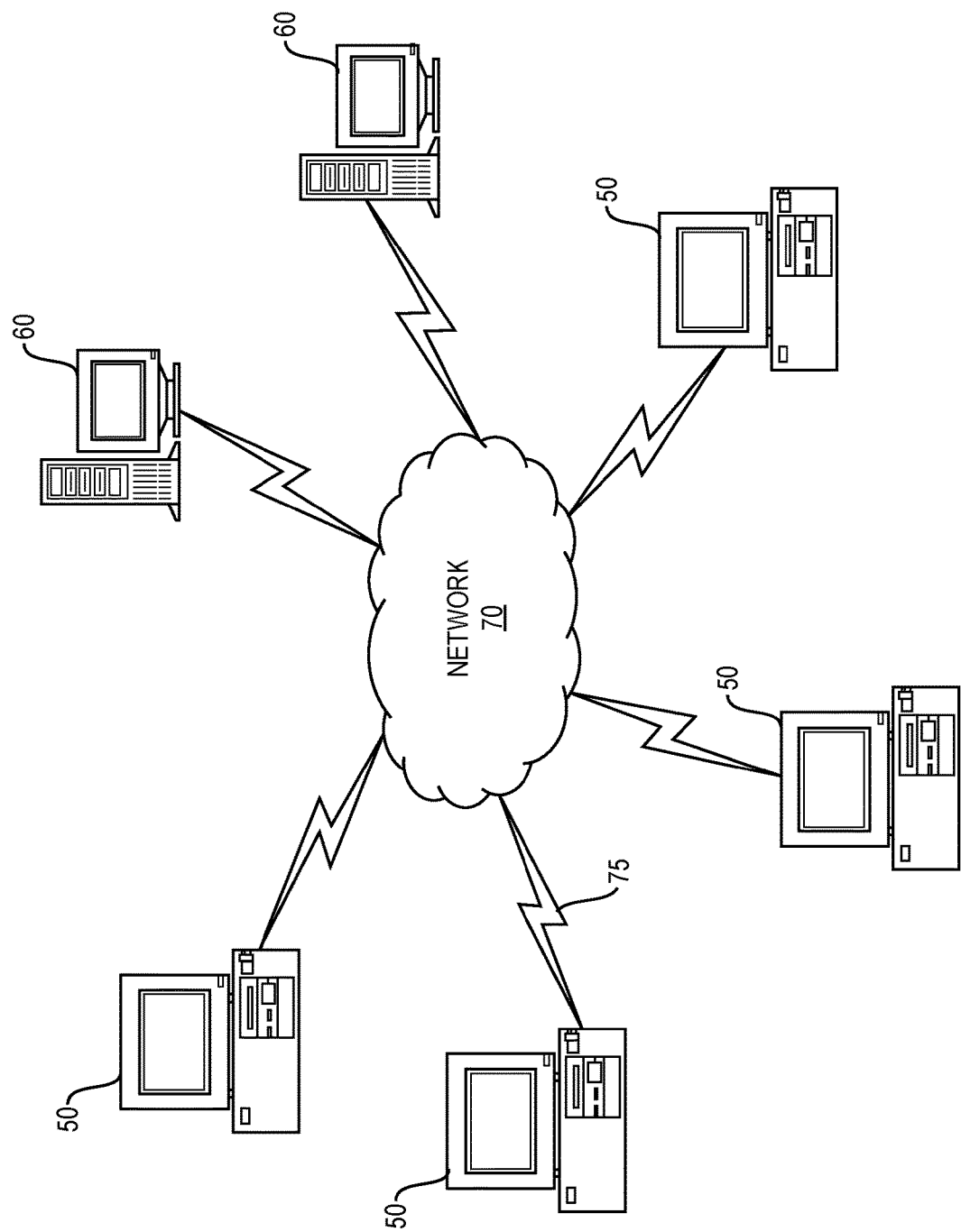
FIG. 5 is a schematic view of a computer network environment in which example embodiments can be implemented.

FIG. 5 illustrates a computer network or similar digital processing environment in which embodiments, e.g. methods 100 of FIG. 1, 230 of FIG. 2, 330 of FIG. 3, and 430 of FIG. 4, may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 6:
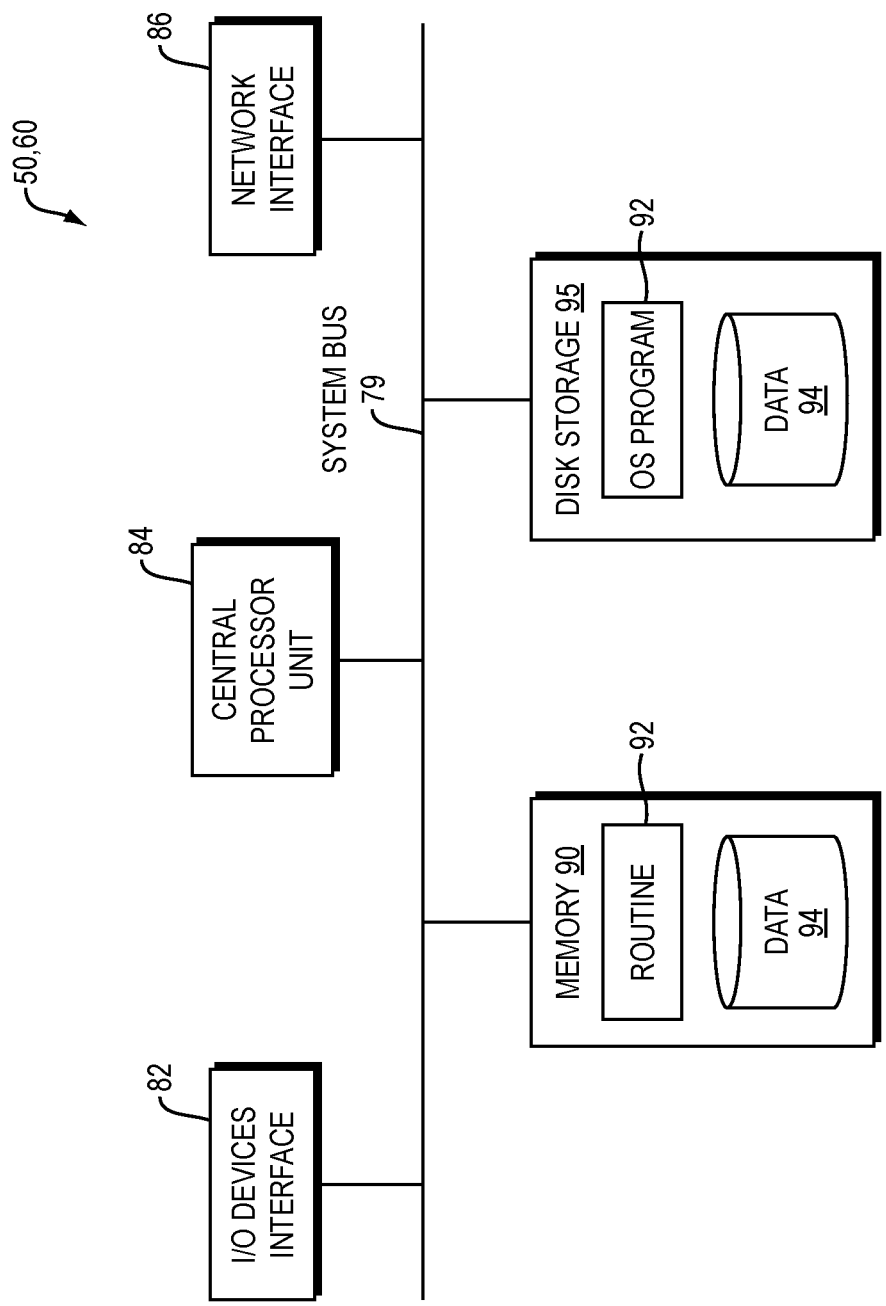
FIG. 6 is a block diagram illustrating an example computer node of the network environment of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, and network ports) that enables the transfer of information between the elements. Attached to system bus 79 is I/O device interface 82 for connecting various input and output devices (e.g., keyboard, mouse, displays, printers, and speakers) to the computer 50, 60. Network interface 86 allows the computer to connect to various other devices attached to a network (e.g., network 70 of FIG. 5). Memory 90 provides volatile storage for computer software instructions 92 and data 94 used to implement many embodiments (e.g., code detailed above and in FIGS. 1-4 including methods 100, 230, 330, and 430). Disk storage 95 provides non-volatile storage for computer software instructions 92 and data 94 used to implement many embodiments. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, and tapes) that provides at least a portion of the software instructions for the system. Computer program product 92 can be installed by any suitable software installation procedure, as is well known in the art. In another embodiment, at least a portion of the software instructions may also be downloaded over a cable, communication and/or wireless connection. In other embodiments, the programs are a computer program propagated signal product 75 (FIG. 5) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

[1] Rishabh Dudheria, Wade Trappe, and Naftaly Minsky. Coordination and control in mobile ubiquitous computing applications using law governed interaction. In *Proc. of the Fourth International Conference on Mobile Ubiquitous Computing, Systems, Services and Technologies (UBICOMM) Florence, Italy*, pages 247-256, October 2010.

[2] John Ioannidis and Steven Michael Bellovin. Implementing pushback: Router-based defense against ddos attacks. 2002.

[3] Naftaly H. Minsky. *Law Governed Interaction (LGI): A Distributed Coordination and Control Mechanism (An Introduction, and a Reference Manual)*. Rutgers, February 2006. (available at http://www.moses.rutgers.edu/).

[4] Naftaly H Minsky. On the dependability of highly heterogeneous and open distributed systems. *Journal of Software Engineering and Applications,* 11(01):28, 2018.

[5] Naftaly H. Minsky and V. Ungureanu. Law-governed interaction: a coordination and control mechanism for heterogeneous distributed systems. *TOSEM, ACM Transactions on Software Engineering and Methodology,* 9(3):273-305, July 2000.

[6] Eric Osterweil, Angelos Stavrou, and Lixia Zhang. 21 years of distributed denial-of-service: A call to action. *Computer,* 53(8):94-99, 2020.

[7] T. Peng, C. Leckie, and Ramamohanarao K. Survey of network-based defense mechanisms countering the dos and ddos problems. *ACM Computing Surveys,* 39(1), 2007.

[8] Zhe Wang and Naftaly Minsky. A novel, privacy preserving, architecture for online social networks. *EAI Endorsed Transactions on Collaborative Computing—Accepted for publication in* 2016, December 2015.

What is claimed is:

1. A method of defending a server against distributed denial-of-service (DDoS) attacks, the method comprising:
   obtaining an indication of packets defined as important by a defending server;
   defining a discrimination criterion, the discrimination criterion being a mechanism to identify packets complying with the obtained indication;
   obtaining packets; and
   for each obtained packet, controlling transmission of the packet to the defending server based on a verification, using the discrimination criterion, that the packet complies with the obtained indication, thereby defending the server from DDoS attacks;
   wherein controlling transmission of the packet to the defending server comprises:
      at a guarding node associated with the defending server, modifying or maintaining a pass field of the packet to indicate compliance or non-compliance with the obtained indication; and
      transmitting the packet to the defending server in response to the pass field of the packet indicating compliance with the obtained indication; or carrying out a policy of dropping the packet, at a router, in response to the pass field of the packet indicating non-compliance with the obtained indication.

2. The method of claim 1 wherein controlling the transmission of the packet to the defending server comprises:
   transmitting the packet to the defending server in response to a result of the verification indicating compliance with the obtained indication; or
   at a scrubber or an appendix thereof, dropping the packet in response to the result of the verification indicating non-compliance with the obtained indication.

3. The method of claim 1 further comprising:
   at a router, in response to a given packet of the obtained packets being obtained from a node that is external to a domain of the router, adding a pass field to the given packet and setting the pass field to indicate non-compliance with the obtained indication.

4. The method of claim 1 wherein controlling the transmission of the packet to the defending server further comprises:
   transmitting the packet to the defending server.

5. The method of claim 1 further comprising:
   configuring the router to establish, in response to receiving a protection command, the policy of dropping the packet in response to the pass field of the packet indicating non-compliance.

6. The method of claim 1 further comprising at least one of:
   configuring the router to suspend, after a time interval, the policy of dropping the packet in response to the pass field of the packet indicating non-compliance; and
   instating the policy in response to receiving an indication that the defending server is under attack.

7. The method of claim 1 further comprising:
   tracking a quantity of packets addressed to the defending server that arrive at the router within a time interval; and
   suspending, in response to receiving a status indicator indicating that the defending server is not under attack, the policy of dropping the packet in response to the pass field of the packet indicating non-compliance, the status indicator having been set based on the tracked quantity.

8. The method of claim 1 further comprising:
   recursively changing a port number of a guarding node or a scrubber configured to support the controlling of the transmission of the packet to the defending server.

9. The method of claim 1 further comprising:
   receiving, from a registry of servers, an indication of approval to defend the defending server.

10. The method of claim 1 wherein the obtained indication includes at least one of:
    a rate control parameter; and
    a self-authentication requirement.

11. The method of claim 1 wherein the verification that the packet complies with the obtained indication comprises:
    verifying a certificate of a sender of the packet; and
    verifying a hash of the discrimination criterion presented by the sender of the packet.

12. A system for defending a server against distributed denial-of-service (DDoS) attacks, the system comprising:
    a processor; and
    a memory with computer code instructions stored thereon, the processor and the memory, with the computer code instructions, being configured to cause the system to:
       obtain an indication of packets defined as important by a defending server;
       define a discrimination criterion, the discrimination criterion being a mechanism to identify packets complying with the obtained indication;
       obtain packets; and
       for each obtained packet, control transmission of the packet to the defending server based on a verification, using the discrimination criterion, that the packet complies with the obtained indication, thereby defending the server from DDoS attacks;
    wherein control transmission of the packet to the defending server comprises:
       at a guarding node associated with the defending server, modify or maintain a pass field of the packet to indicate compliance or non-compliance with the obtained indication; and
       transmit the packet to the defending server in response to the pass field of the packet indicating compliance with the obtained indication; or carry out a policy of dropping the packet, at a router, in response to the pass field of the packet indicating non-compliance with the obtained indication.

13. The system of claim 12 wherein, in controlling transmission of the packet to the defending server, the processor and the memory, with the computer code instructions, are further configured to cause the system to:
    transmit the packet to the defending server in response to a result of the verification indicating compliance with the obtained indication; or
    at a scrubber or an appendix thereof, drop the packet in response to the result of the verification indicating non-compliance with the obtained indication.

14. The system of claim 12 wherein, in controlling transmission of the packet to the defending server, the processor and the memory, with the computer code instructions, are further configured to cause the system to:
    transmit the packet to the defending server.

15. The system of claim 12 wherein the processor and the memory, with the computer code instructions, are further configured to cause the system to:
    recursively change a port number of a guarding node or a scrubber configured to support the controlling of the transmission of the packet to the defending server.

16. A computer program product for defending a server against distributed denial-of-service (DDoS) attacks, the computer program product comprising: a non-transitory computer-readable medium having computer-readable program instructions stored thereon, the instructions, when executed by a processor, causing the processor to:
- obtain an indication of packets defined as important by a defending server;
- define a discrimination criterion, the discrimination criterion being a mechanism to identify packets complying with the obtained indication;
- obtain packets; and
- for each obtained packet, control transmission of the packet to the defending server based on a verification, using the discrimination criterion, that the packet complies with the obtained indication, thereby defending the server from DDoS attacks;
- wherein control transmission of the packet to the defending server comprises:
  - at a guarding node associated with the defending server, modify or maintain a pass field of the packet to indicate compliance or non-compliance with the obtained indication; and
  - transmit the packet to the defending server in response to the pass field of the packet indicating compliance with the obtained indication; or carry out a policy of dropping the packet, at a router, in response to the pass field of the packet indicating non-compliance with the obtained indication.

* * * * *